B. T. Roath,
Cork Machine.

Nº 43,867.   Patented Aug. 16, 1864.

Witnesses.   Inventor.

UNITED STATES PATENT OFFICE.

BENJAMIN T. ROATH, OF NORWICH, CONNECTICUT.

IMPROVEMENT IN MACHINES FOR TRIMMING CORKS.

Specification forming part of Letters Patent No. 43,857, dated August 16, 1864.

*To all whom it may concern:*

Be it known that I, BENJAMIN T. ROATH, of Norwich, in the county of New London and State of Connecticut, have invented a new and Improved Machine for Trimming Corks; and I do hereby declare that the following is a full, clear, and exact description thereof, which will enable others skilled in the art to make and use the same, reference being had to the accompanying drawings, forming part of this specification, in which—

Figure 1:
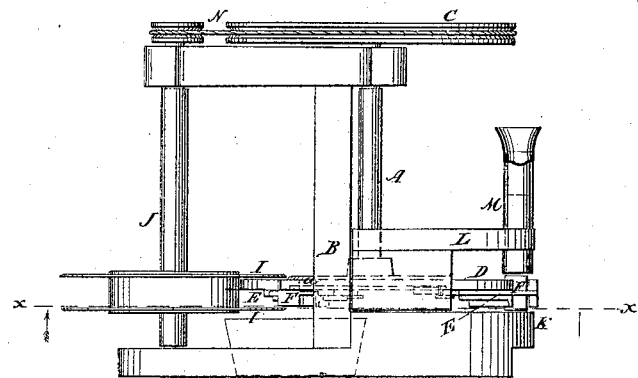
Figure 2:
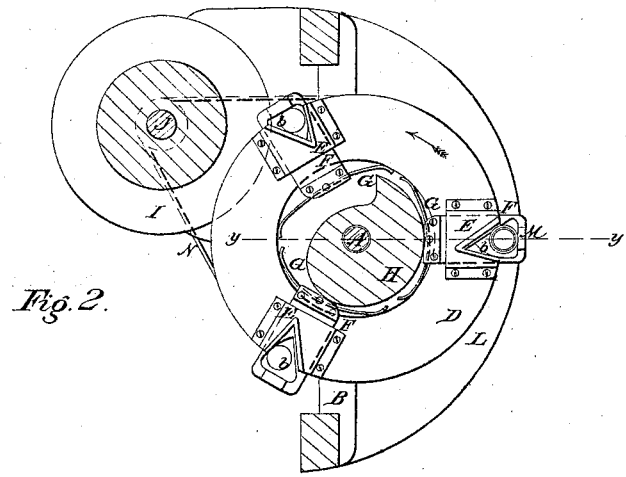
Figure 3:
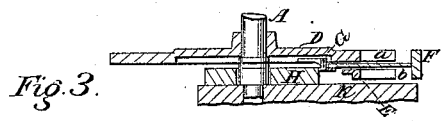

Figure 1 is a side view of my invention; Fig. 2, a horizontal section of the same, looking upward, taken in the line $xx$, Fig. 1; Fig. 3, a vertical section of a portion of the same, taken in the line $yy$, Fig. 2.

Similar letters of reference indicate like parts.

This invention relates to a machine for trimming the ends of corks—that is to say, for cutting their ends parallel with each other.

The invention consists in the employment or use of a rotating disk provided with clamps or holders so arranged and operated that they will receive and hold the corks while being cut and release them after being cut, and using, in connection with said disk and clamps, rotary cutters, all being arranged in such a manner that the work may be done rapidly and in a perfect manner.

A represents a vertical shaft, which is placed in a suitable framing, B, and has a pulley, C, on its upper end and a circular disk, D, on its lower end. The disk D has three notches, $a$, of V form, made in its edge at suitable and equal distances apart, and to the under side of said disk there are attached guides E, in which slides F are fitted and allowed to work freely, said slides being in line with the notches $a$, and having triangular openings $b$ made in them to receive the corks to be trimmed. The inner end of each slide F is connected with a spring, G, and these springs have a tendency to keep the inner ends of the slides F in contact with a cam H, which is on the shaft A, directly below the disk D. The shape of this cam is shown clearly in Fig. 2.

I I are two circular cutters, which are keyed on a vertical shaft, J, in the framing B. The cutters I I are placed at a distance apart equal to the desired length of the corks when trimmed, and said cutters lap over the edge of the disk D. The disk D works over a semicircular bar, K, at the lower part of the framing B, and a similar bar, L, is placed on the disk, the latter bar being also attached to the framing and having a tube, M, fitted vertically in it. (Shown clearly in Fig. 1.)

The operation is as follows: The shaft A is rotated by any convenient power, and motion may be communicated from A to the shaft J by means of a belt, N, or gearing; or the shaft J may be driven separately. The corks are placed in the tube M and drop down on the edge of the disk D, a cork passing down in the notches $a$ and through the openings $b$ in the slides F, and resting on the bar K, on which they are carried around until the inner ends of the slides F pass the prominent portion $c$ of the cam H, when the springs G draw the slides F inward and grasp the corks firmly in the notches $a$, just before the corks pass between the cutters I I, which trim their upper and lower ends. After the trimmed corks leave the cutters I I, the cam H forces the slides F outward and releases the corks, which drop from the machine, the cam H keeping the slides F forced outward while they receive the corks and until just before the latter pass between the cutters.

This machine may be attended by a child equally as well as by an adult. It may be cheaply constructed and made to trim corks of any length by adjusting the cutters I I at a greater or less distance apart and raising or lowering the disk D to suit the position of the cutters.

I claim as new and desire to secure by Letters Patent—

The rotating disk D, provided with the clamps or holders F, in combination with the circular rotary cutters I I, all arranged to operate substantially as and for the purpose herein set forth.

BENJAMIN T. ROATH.

Witnesses:
JAMES P. HALL,
M. M. LIVINGSTON.